United States Patent
Shehata et al.

(10) Patent No.: US 12,512,034 B2
(45) Date of Patent: Dec. 30, 2025

(54) SYSTEMS AND METHODS FOR DITHERING FOR DYNAMICALLY FOVEATED CONTENT

(71) Applicant: Apple Inc., Cupertino, CA (US)

(72) Inventors: Shereef Shehata, San Ramon, CA (US); Jim C Chou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 18/328,666

(22) Filed: Jun. 2, 2023

(65) Prior Publication Data

US 2024/0404449 A1 Dec. 5, 2024

(51) Int. Cl.
*G09G 3/20* (2006.01)
*G06F 3/01* (2006.01)

(52) U.S. Cl.
CPC ............ *G09G 3/2044* (2013.01); *G06F 3/013* (2013.01); *G09G 2340/0407* (2013.01)

(58) Field of Classification Search
CPC .................................................... G09G 3/2044
See application file for complete search history.

(56) References Cited

U.S. PATENT DOCUMENTS

| 6,664,955 | B1 | 12/2003 | Deering | |
|---|---|---|---|---|
| 11,435,821 | B2 | 9/2022 | Wang et al. | |
| 2008/0111833 | A1 | 5/2008 | Thorn et al. | |
| 2018/0284451 | A1 | 10/2018 | Eash et al. | |
| 2019/0206369 | A1 | 7/2019 | Kempf et al. | |
| 2019/0295503 | A1* | 9/2019 | Ouderkirk | G09G 5/04 |
| 2021/0096644 | A1* | 4/2021 | Wang | H04N 19/17 |

* cited by examiner

*Primary Examiner* — Shivang I Patel
(74) *Attorney, Agent, or Firm* — Fletcher Yoder, P.C.

(57) ABSTRACT

An electronic device that includes a display and an eye tracker configured to collect eye tracking data regarding a gaze of one or more of a user's eyes across the display. The electronic device also includes processing circuitry that is operatively coupled to the display and configured to generate pixel data for frames of content based on the eye tracking data such that the content is configured to be shown on the display in a dynamically foveated manner. The processing circuitry is configured to determine dither blocks, each of which corresponds to a subset of the plurality of pixels. The processing circuitry is configured to apply a dither pattern to the frames of the plurality of frames of content independent of the gaze of one or more of the user's eyes and based on the dither blocks.

20 Claims, 11 Drawing Sheets

SYSTEMS AND METHODS FOR DITHERING FOR DYNAMICALLY FOVEATED CONTENT

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to dither techniques that can be used with foveated content, such as dynamically foveated content. Foveation refers to a technique in which the amount of detail or resolution is varied across an image based on a fixation point, such as a point or area within the image itself, a point or region of the image on which a viewer's eyes are focused, or based on the gaze movement of the viewer's eyes. More specifically, the amount of detail can be varied by using different resolutions in various portions of an image. For example, in static foveation, the size and location of the various resolution areas of an electronic display are fixed. As another example, in dynamic foveation, the areas of the electronic display at which the various resolutions are used may change between two or more images based on the viewer's gaze. For example, in content that uses multiple images, such as videos and video games, the content may be presented to viewers by displaying the images in rapid succession. The portions of the electronic display in which the content is displayed with relatively high and low resolutions may change between frames.

Dithering generally refers to techniques that apply noise to image data. For instance, a dither pattern may be applied to image data to be displayed by pixels of an electronic display to prevent the occurrence of color banding in frames of content. When dynamically foveated content (e.g., images or frames of content) is being presented and dither patterns for the content are determined based a user's gaze, many different dither patterns may be used across multiple frames of image content. Visual artifacts may occur due to changing dither patterns over time during dynamic foveation. Visual artifacts that remain on a display may be referred to as image retention, image persistence, sticking artifacts, and/or ghost images. Additionally, visual artifacts may cause an image to appear to the human eye to remain on a display for a period of time after the image content is no longer being provided by the electronic display. For instance, the human eye may perceive that one frame of content or a portion thereof is being displayed on a display when the display is actually showing a later frame of the content.

Accordingly, to reduce and/or eliminate visual artifacts, gaze-independent dither techniques are provided. More specifically, by defining dither blocks (e.g., groups of pixels for which corresponding image data will be dithered in the same manner) based on the native locations of pixels within a display rather than locations of pixels in foveation groups that may move between frames, more uniform dither patterns may be achieved between frames of content. By supplying more uniform dither patterns, image artifacts due to dither that are perceivable to the human eye may be reduced or eliminated.

More specifically, a multi-step linear-feedback shift register may be utilized to map differently-sized foveation groups to dither blocks (which are defined based on the native locations of pixels on a display). When pixels in one dither block include pixels from different foveation grouping regions, it may be said that there is a "foveation boundary mismatch." Foveation boundary mismatches may cause a dither pattern to change between frames of content. Accordingly, to increase the uniformity of dither patterns between frames, techniques discussed below may be utilized to correct for foveation boundary mismatches.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
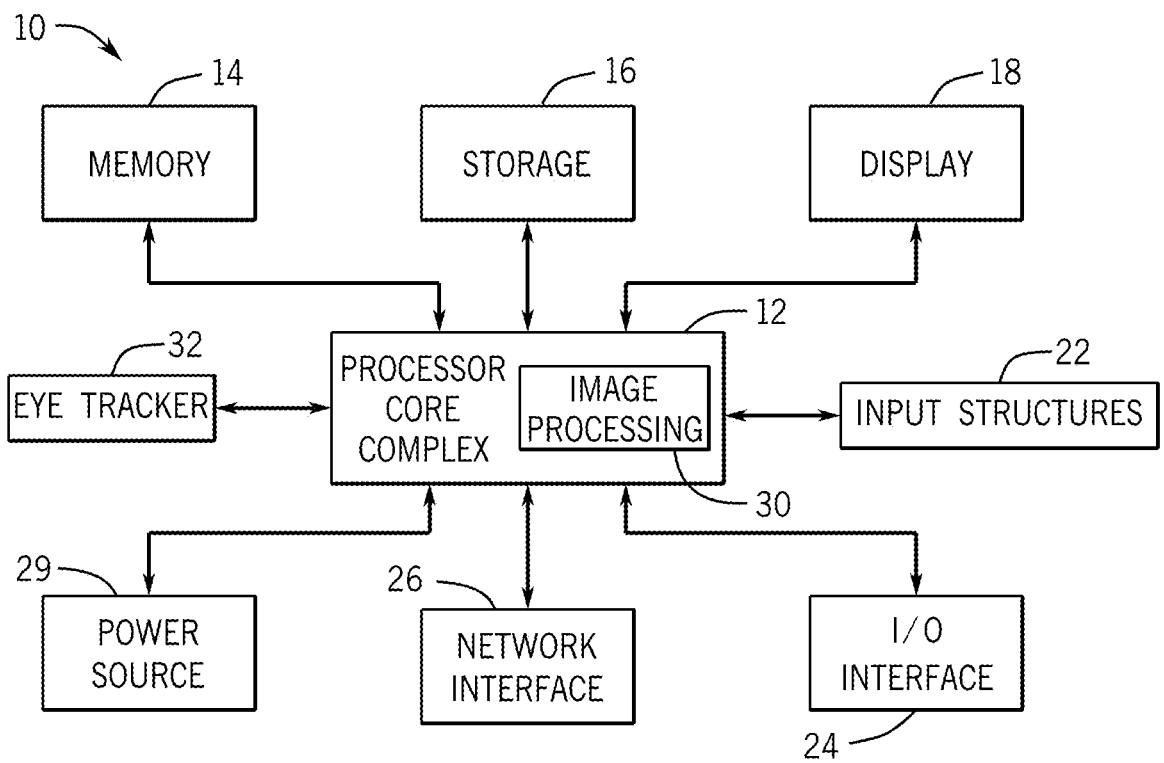
FIG. 1 is a block diagram of an electronic device with an electronic display, in accordance with an embodiment.
Figure 2:
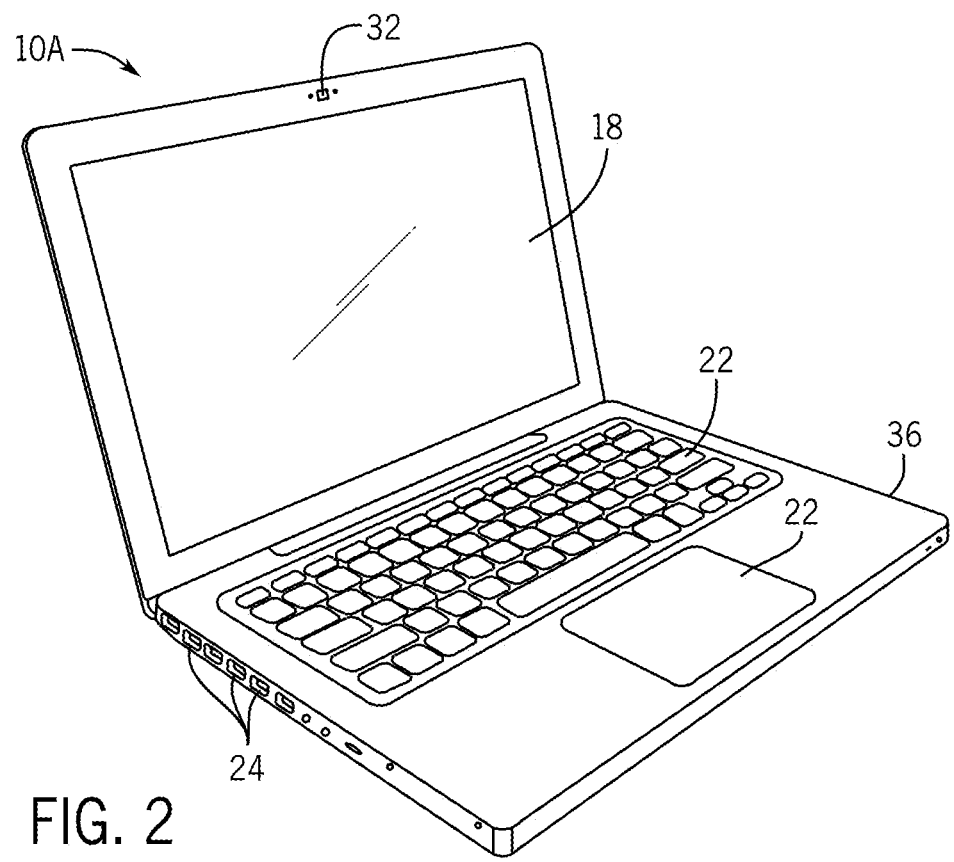
FIG. 2 is a perspective view of a notebook computer representing an embodiment of the electronic device of FIG. 1.
Figure 4:
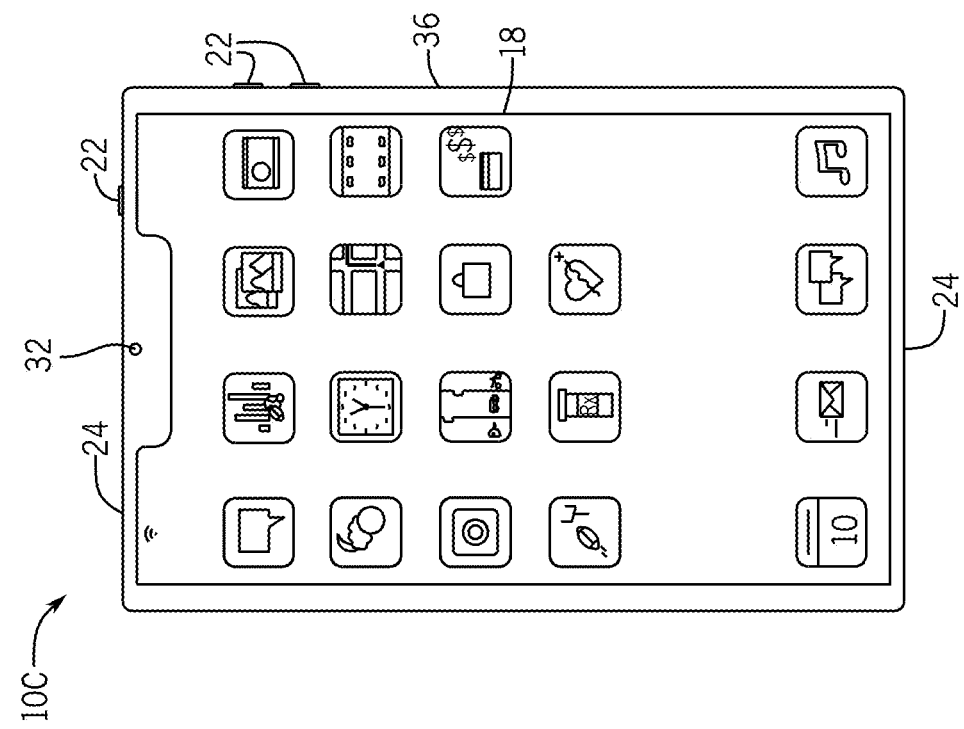
FIG. 4 is a front view of another hand-held device representing another embodiment of the electronic device of FIG. 1.
Figure 3:
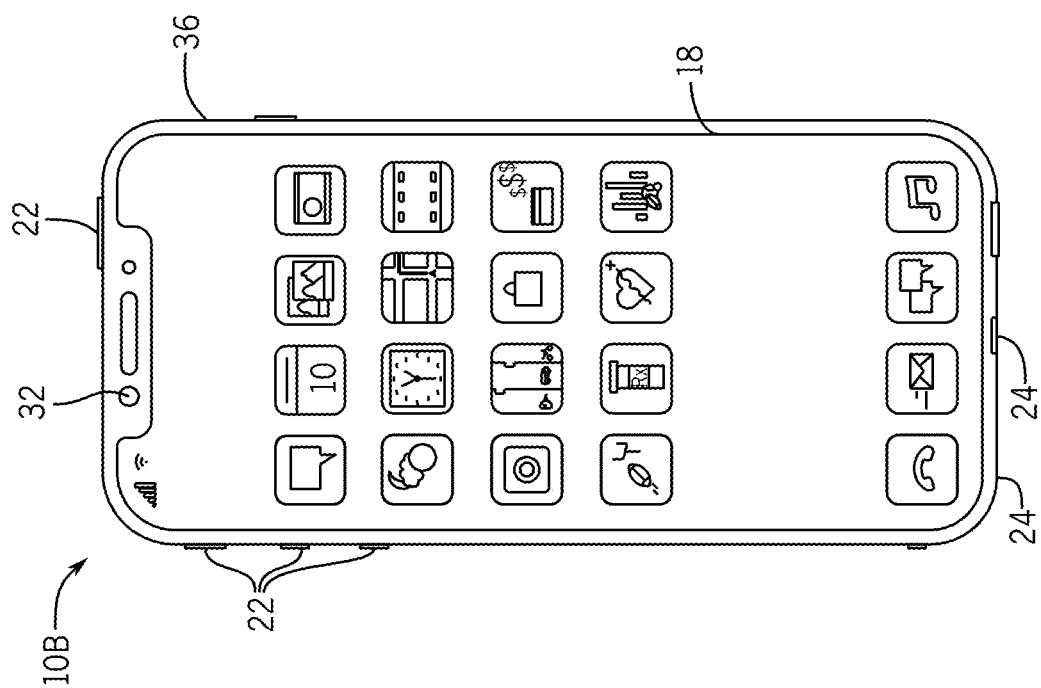
FIG. 3 is a front view of a hand-held device representing another embodiment of the electronic device of FIG. 1.
Figure 5:
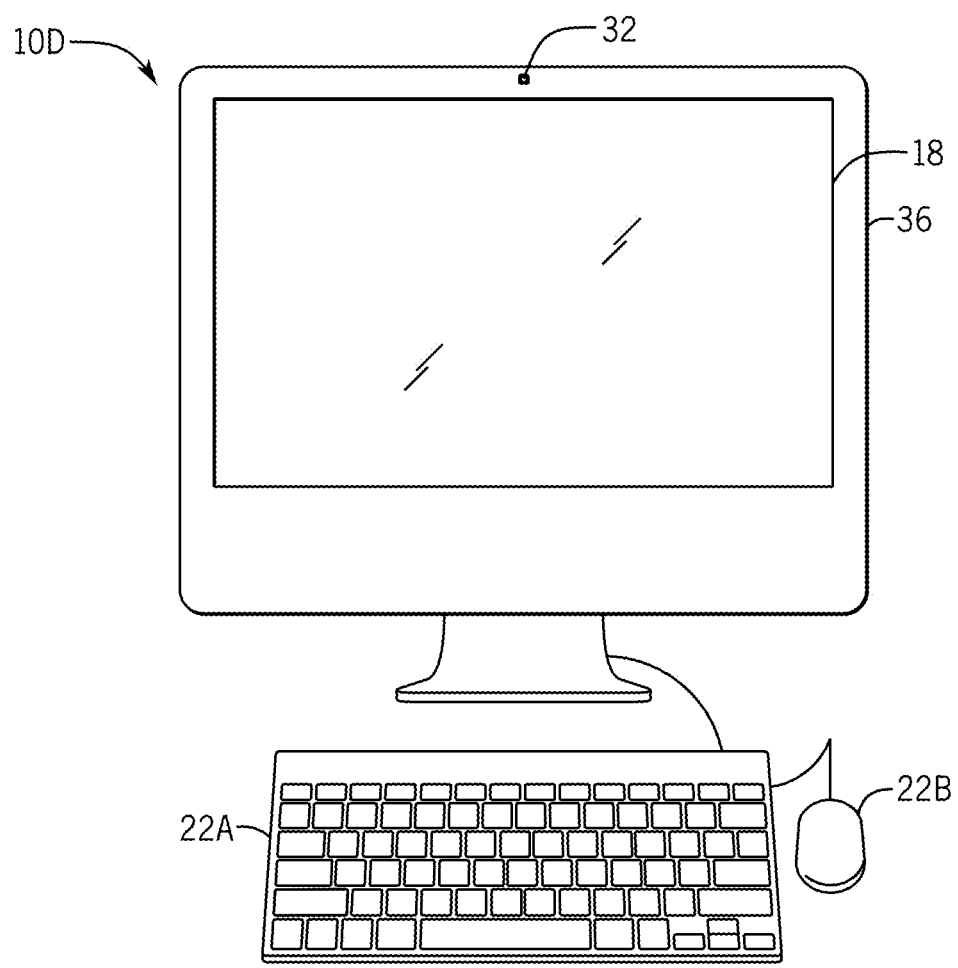
FIG. 5 is a front view of a desktop computer representing another embodiment of the electronic device of FIG. 1.
Figure 6:
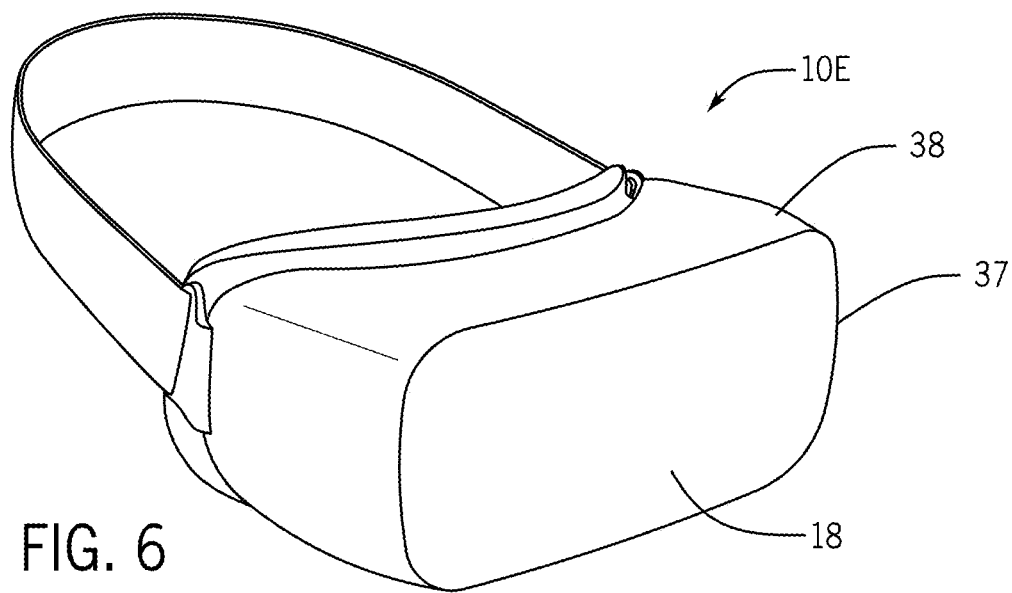
FIG. 6 is a perspective view of a wearable electronic device representing another embodiment of the electronic device of FIG. 1.

With this in mind, FIG. 1 illustrates a block diagram of an electronic device 10 that may provide gaze-independent dithering for foveated content, such as dynamically foveated content. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or any suitable similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, a power source 29, image processing circuitry 30, and an eye tracker 32. The image processing circuitry 30 may prepare image data (e.g., pixel data) from the processor core complex 12 for display on the electronic display 18. Although the image processing circuitry 30 is shown as a component within the processor core complex 12, the image processing circuitry 30 may represent any suitable hardware and/or software that may occur between the initial creation of the image data and its preparation for display on the electronic display 18. Thus, the image processing circuitry 30 may be located wholly or partly in the processor core complex 12, wholly or partly as a separate component between the processor core complex 12 and the electronic display 18, or wholly or partly as a component of the electronic display 18.

The various functional blocks shown in FIG. 1 may include hardware elements (including circuitry), software elements (including machine-executable instructions stored on a tangible, non-transitory medium, such as the local memory 14 or the main memory storage device 16), or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For instance, the local memory 14 and the main memory storage device 16 may be included in a single component.

The processor core complex 12 may carry out a variety of operations of the electronic device 10, such as generating image data to be displayed on the electronic display 18 and applying dither patterns to the image data. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diode (OLED) display, an LED display, or μLED display, or may be a liquid crystal display (LCD) illuminated by a backlight. In some embodiments, the electronic display 18 may include a touch screen, which may allow users to interact with a user interface of the electronic device 10. Additionally, the electronic display 18 may show foveated content.

The input structures 22 of the electronic device 10 may enable a user to interact with the electronic device 10 (e.g., pressing a button or icon to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 29 may include any suitable source of power, such as a rechargeable lithium polymer (Li-poly) battery and/or an alternating current (AC) power converter.

The eye tracker 32 may measure positions and movement of one or both eyes of someone viewing the electronic display 18 of the electronic device 10. For instance, the eye tracker 32 may be a camera that can record the movement of a viewer's eyes as the viewer looks at the electronic display 18. However, several different practices may be employed to track a viewer's eye movements. For example, different types of infrared/near infrared eye tracking techniques such as bright-pupil tracking and dark-pupil tracking may be utilized. In both of these types of eye tracking, infrared or near infrared light is reflected off of one or both of the eyes of the viewer to create corneal reflections. A vector between the center of the pupil of the eye and the corneal reflections may be used to determine a point on the electronic display 18 at which the viewer is looking. Moreover, as discussed below, varying portions of the electronic display 18 may be used to show content in high and low resolution portions based on where a viewer's eyes are looking on the electronic display 18.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18. Additionally, the computer 10A may also include an eye tracker 32, such as a camera.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol. Moreover, the handheld device 10B may include an eye tracker 32.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. As with the handheld device 10B, the handheld device 10C may also include an eye tracker 32.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D. Furthermore, the computer 10D may include an eye tracker 32.

Similarly, FIG. 6 depicts a wearable electronic device 10E representing another embodiment of the electronic device 10 of FIG. 1 that is configured to operate using the techniques described herein. By way of example, the wearable electronic device 10E may be virtual reality glasses. However, in other embodiments, the wearable electronic device 10E may include other wearable electronic devices such as augmented reality glasses. The electronic display 18 of the wearable electronic device 10E may be visible to a user when the user is wearing the wearable electronic device 10E. Additionally, while the user is wearing the wearable electronic device 10E, an eye tracker of the wearable electronic device 10E may track the movement of one or both of the user's eyes. In some instances, the handheld device 10B may be used in the wearable electronic device 10E. For example, a portion 37 of a headset 38 of the wearable electronic device 10E may allow a user to secure the handheld device 10B into place and use the handheld device 10B to view virtual reality content.

The electronic display 18 of the electronic device 10 may show images or frames of content such as photographs, videos, and video games in a foveated manner. Foveation refers to a technique in which the amount of detail or resolution is varied across an image based on a fixation point, such as a point or area within the image itself, a point or region of the image on which a viewer's eyes are focused, or based on the gaze movement of the viewer's eyes. More specifically, the amount of detail can be varied by using different resolutions in various portions of an image. For instance, in one area of the electronic display 18, one pixel resolution may be used to display one portion of an image, whereas a lower or higher pixel resolution may be used to display another portion of the image in another area of the electronic display 18.

Figure 7A:
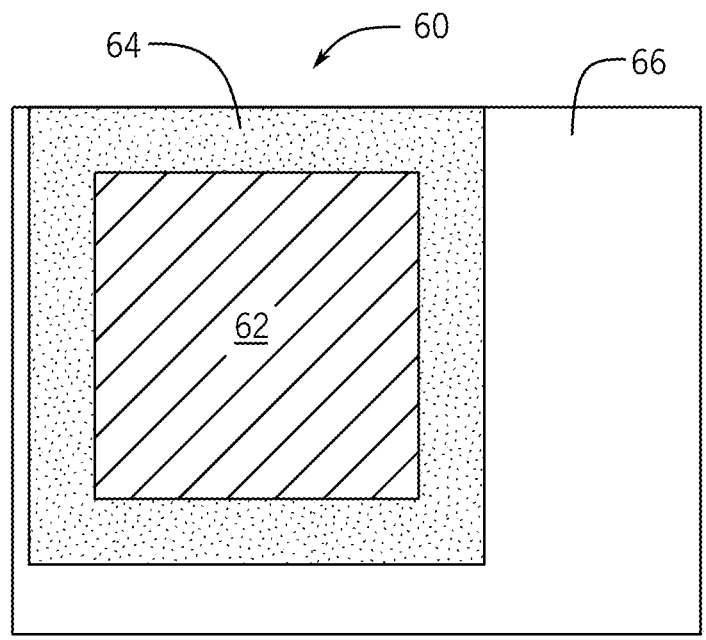
FIG. 7A is a diagram of the display of FIG. 1 in which static foveation is utilized.

To display foveated content, the electronic display 18 may display content in foveated regions, meaning the resolution of the content shown on the electronic display 18 may differ at various portions of the electronic display 18. For instance, FIG. 7A is a diagram 60 representative of the electronic display 18 utilizing static foveation. In static foveation, the size and location of the various resolution areas of the electronic display 18 are fixed. In the illustrated embodiment, the electronic display 18 includes a high resolution area 62, a medium resolution area 64, and a low resolution area 66. However, in other embodiments, there may be two or more foveated regions (e.g., a high resolution area and a lower resolution area).

Figure 7B:
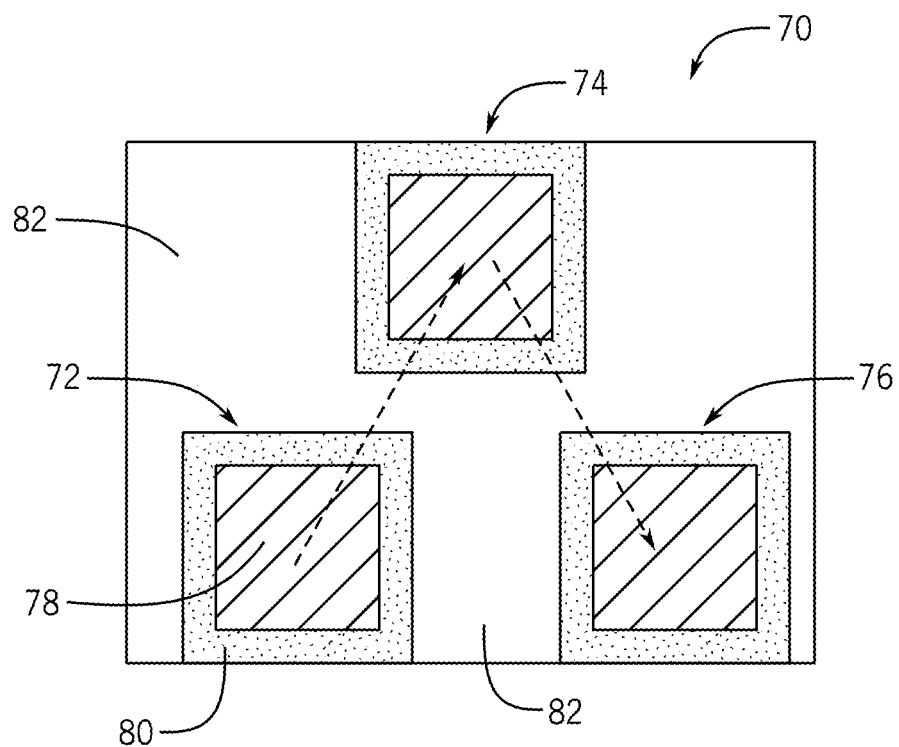
FIG. 7B is a diagram of the display of FIG. 1 in which dynamic foveation is utilized, in accordance with an embodiment.

As described above, electronic displays such as the electronic display 18 may also use dynamic foveation. In dynamic foveation, the areas of the electronic display 18 at which the various resolutions are used may change between two or more images based on the viewer's gaze. For example, in content that uses multiple images, such as videos and video games, the content may be presented to viewers by displaying the images in rapid succession. The portions of the electronic display 18 in which the content is displayed with a relatively high and low resolution may change, for instance, based on data collected by the eye tracker 32 indicative of a location of the electronic display 18 where the viewer's gaze is focused. With this in mind, FIG. 7B shows a diagram 70 that illustrates portions of the electronic display 18 associated with a first frame of content 72, a second frame of content 74, and a third frame of content 76. For each of the frames 72, 74, 76, a high resolution area 78, medium resolution area 80, and low resolution area 82 are utilized. During a transition from the first frame 72 to the second frame 74, the high resolution area 78 and medium resolution area 80 shift from being positioned near the bottom left corner of the electronic display 18 to the top central part of the electronic display 18 as the viewer's gaze similarly shifts. Similarly, the high resolution and medium resolution areas 78 and 80 shift towards the bottom right corner of the electronic display 18 with the viewer's gaze when the third frame 76 is displayed.

Keeping the foregoing in mind, the present disclosure provides techniques that may be utilized when dithering foveated content, such as dynamically foveated content. Dithering generally refers to applying noise to image data. For example, to prevent the appearance of banding (e.g., color banding) in images (e.g., successive frames of image content), a dither pattern may be applied in which image data to be displayed by some pixels of the electronic display 18 may be modified. As a more specific example, gray levels (e.g., values indicating a brightness of a pixel when emitting light) may be increased (to produce relatively brighter content) or decreased (to produce relatively darker displayed content). There are many dither patterns or dither algorithms that may be used to dither content. Examples include the Floyd-Steinberg dithering algorithm, thresholding or average dithering, random dithering, patterning, ordered dithering (e.g., using a dither matrix), and error-diffusion dithering. The techniques discussed herein may be incorporated into, or applied in conjunction with, such dithering patterns or algorithms.

Figure 8:
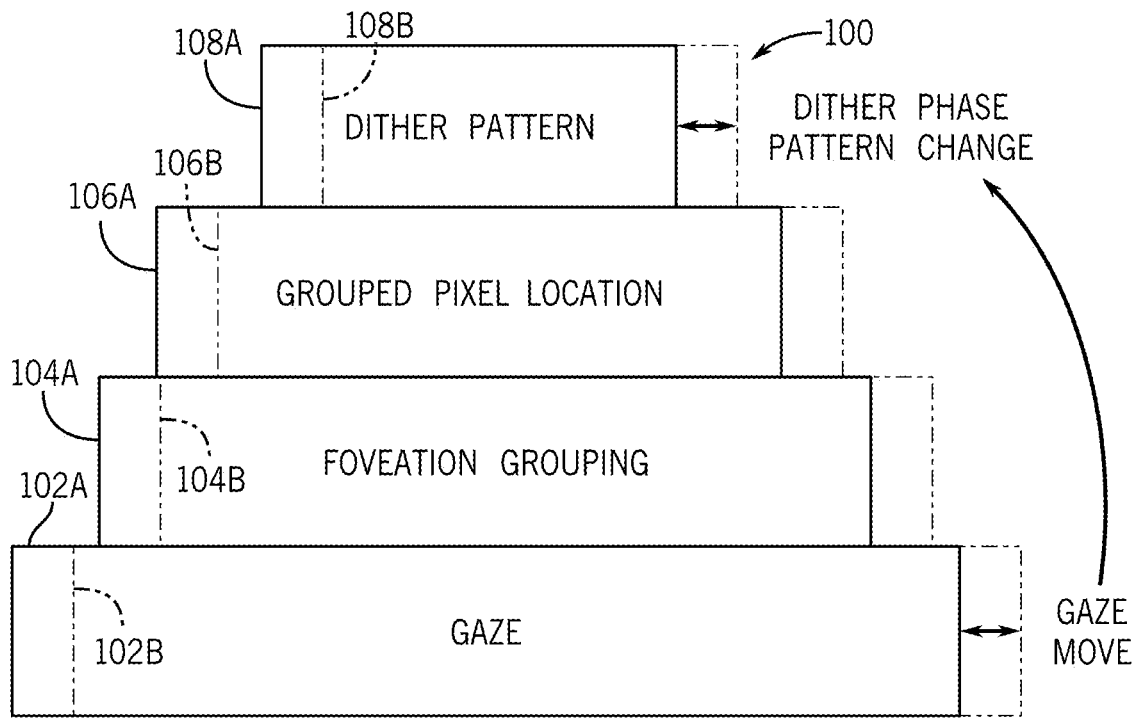
FIG. 8 is a diagram representing gaze-dependent dithering, in accordance with an embodiment.

Continuing with the drawings, FIG. 8 is a diagram 100 representing gaze-dependent dithering. In other words, the diagram 100 is representative of dither patterns that are based on a user's gaze (e.g., as tracked by the eye tracker 32). For example, at a first time, a user's gaze 102A may be directed to one area of the electronic display 18. Based on the user's gaze 102A, the processor core complex 12 may determine foveation groupings 104A, which refers to determining regions of the electronic display 18 in which content of various resolutions will be displayed. For example, the high resolution area 78, medium resolution area 80, and low resolution area 82 of FIG. 7B could be considered different foveation groupings. Based on the foveation groupings 104A, the processor core complex 12 may determine grouped pixel locations 106A, which may be groups of pixels within the foveation groupings 104A. Based on the grouped pixel locations 106A, the processor core complex 12 may determine and apply a dither pattern 108A. Accordingly, dithering may be performed based on a user's gaze or shifts in a user's gaze.

When using gaze-dependent dither techniques, dither patterns presented on the electronic display 18 may shift over time as a user's gaze moves to different areas of the electronic display 18. Continuing with the example from above, at a second time, such as when the user's gaze 102A shifts to gaze 102B, the user may be looking at another portion of the electronic display 18. For example, based on one or both of the user's eyes being tracked by the eye tracker 32, the processor core complex 12 may determine that the user's gaze has moved from one area of the electronic display 18 to another area of the electronic display 18. The processor core complex 12 may determine foveation groupings 104B based on the user having the gaze 102B. Moreover, based on the foveation groupings 104B the processor core complex 12 may determine grouped pixel locations 106B. Furthermore, a different dither pattern 108B may be applied to content presented on the electronic display 18 based on the grouped pixel locations 106B. Accordingly, when utilizing gaze-dependent dither techniques, dither patterns that occur when displaying dynamically foveated content on the electronic display 18 may change when the area of the electronic display 18 at which the user's gaze is focused changes.

Figure 9:
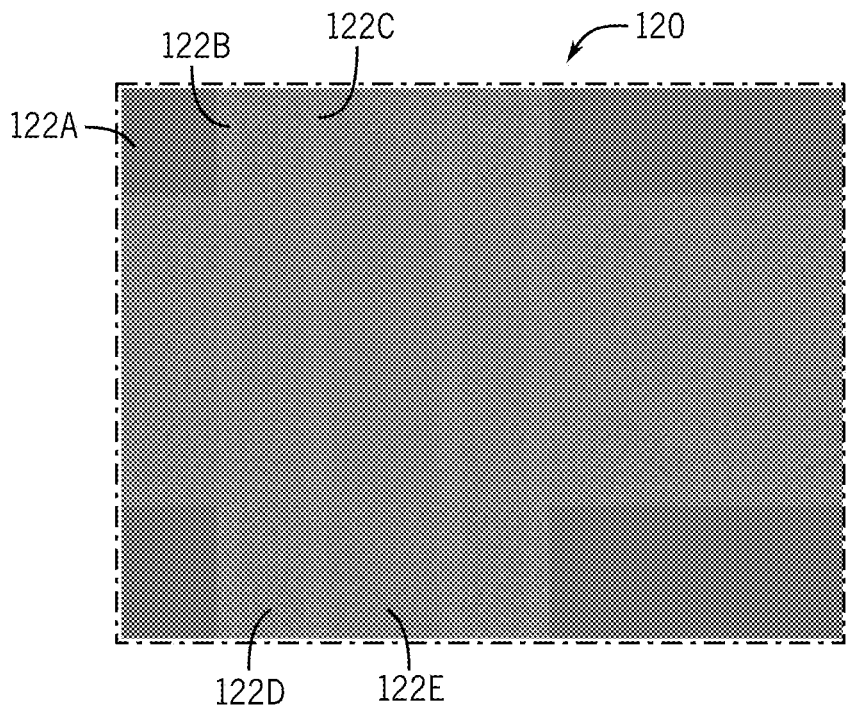
FIG. 9 is an image showing dither patterns from two frames of content overlaid on top of one another when gaze-dependent dithering was used, in accordance with an embodiment.

To help illustrate changes in dither patterns, FIG. 9 is presented. In particular, FIG. 9 includes an image 120 showing dither patterns from two successive frames of image content that are overlaid on top of one another. The image 120 includes various regions 122A-E. A relatively dark region 122A may be indicative of a foveation group that is similar between the two frames that form the image 120 and where the same dither pattern was applied between the two frames of content. Regions 122B-E (and generally any other portion of the image 120 that appears lighter than the region 122A) are indicative of two different dither patterns being used in the two frames. For example, as the foveation groupings 104 change between frames, different pixels of the electronic display 18 may be darker or brighter in one frame compared to the other frame. Because the dither pattern is based on the foveation groupings 104, when a user's gaze shifts and different foveation groupings are used, different dither patterns may be used. When two frames of content with different dither patterns are overlaid, the resulting appearance (e.g., the image 120) may include relatively large amounts of lighter areas (e.g., regions 122B-E) indicative of where the dither patterns differ between the two frames of content.

Using a gaze-dependent dither may result in visual artifacts that are perceptible to a user. For example, as foveation groupings 104 change, the user may be able to see visual artifacts associated with the changes in foveation groupings between frames of content (e.g., because different dither patterns are applied to different frames of content). Using gaze-independent dither techniques described below may decrease or eliminate the perceptibility of visual artifacts.

Figure 10:
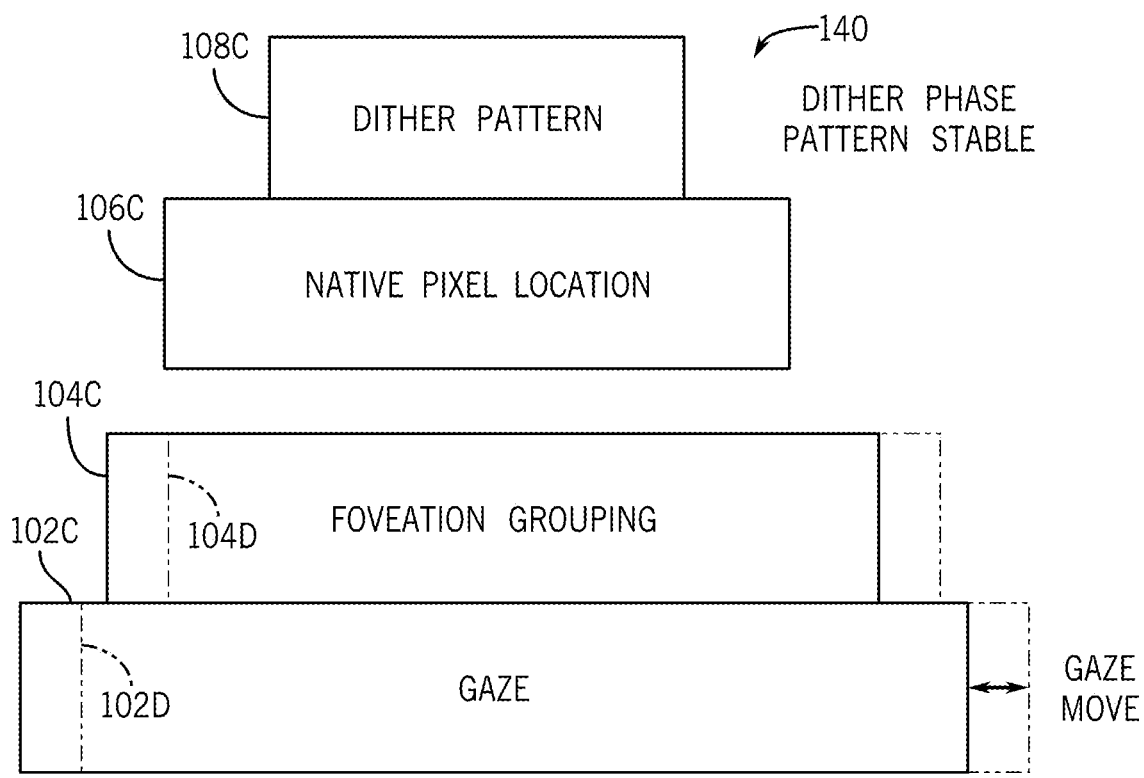
FIG. 10 is a diagram representing gaze-independent dithering, in accordance with an embodiment.

Gaze-independent dithering can also be performed, meaning dither patterns that are applied to frames of image content may be provided independent of a user's gaze (e.g., as detected via the eye tracker 32). Turning to FIG. 10, a diagram 140 is representative of applying a gaze-independent dither. Similar to the image 120 of FIG. 8, a user's gaze may shift (e.g., as shown by gaze 102C shifting to gaze 102D) and the processor core complex 12 may determine foveation groupings 104C, 104D based on each of the gazes 102C, 102D. However, when using gaze-independent dither techniques, grouped pixel locations 106C may be determined using the native location of the pixels. In other words, the processor core complex 12 may determine the grouped pixel locations 106C based on the location of the pixels on the electronic display 18 rather than based on foveation groupings (e.g., foveation grouping regions). In other words, dither patterns may be decoupled from foveation groups. Because the positions of pixels on the electronic display 18 are fixed, the same or similar grouped pixel locations 106C may be used for each frame of image content.

For example, the processor core complex 12 may apply a dither pattern 108C based on the grouped pixel locations 106C. Because the grouped pixel locations 106C are fixed, the dither pattern 108C may be substantially the same across multiple frames of image content. Accordingly, while dynamically foveated content (e.g., gaze-dependent content) is being displayed, dithering may be performed in a gaze-independent manner.

Figure 11:
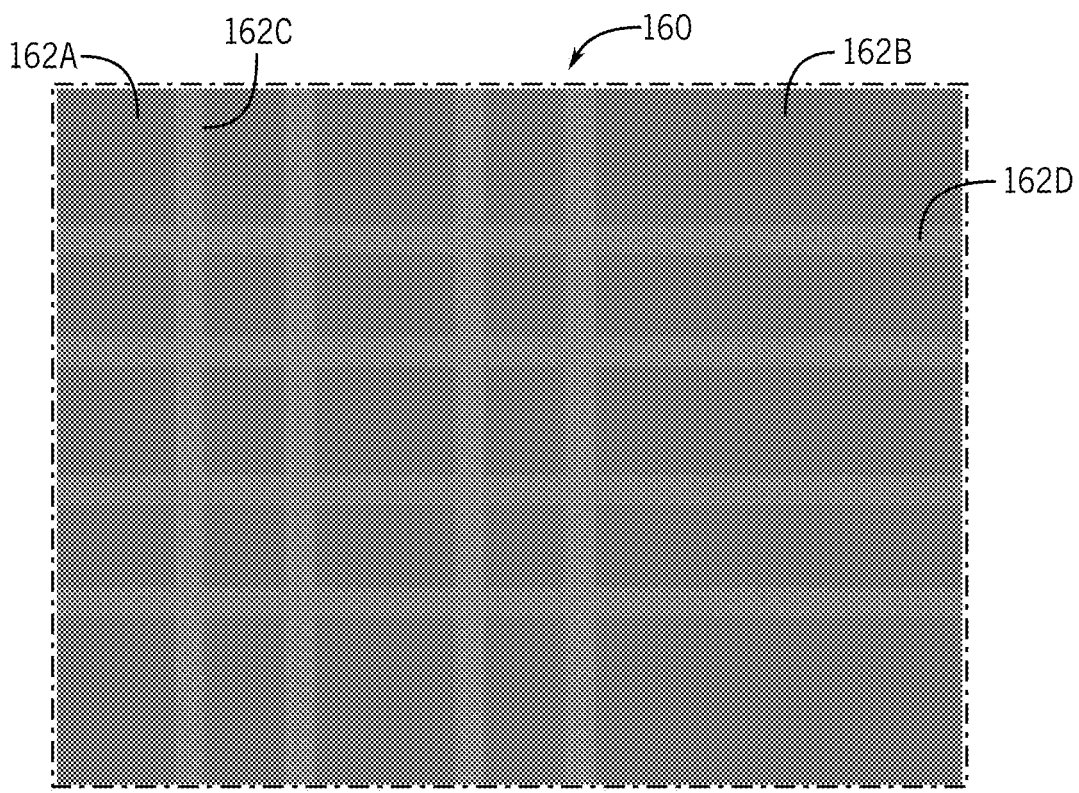
FIG. 11 is an image showing dither patterns from two frames of content overlaid on top of one another when gaze-independent dithering was used, in accordance with an embodiment.

To help illustrate gaze-independent dither patterns, FIG. 11 is presented. In particular, FIG. 11 includes an image 160 showing dither patterns from two successive frames of image content that are overlaid on top of one another. Because the same dither pattern is applied (or two very similar dither patterns are applied) in the two frames of content used to form the image 160, the image 160 includes regions 162A-D that are relatively more pronounced compared to the regions 122A-E of the image 120. In other words, even though different foveation groupings 104 may be used in the two frames of content, the regions 162A-D are indicative of the same dither scheme or similar dither schemes being used on the frames of content. For example, relatively dark regions 162A, 162B may correspond to different foveation groupings 104 in the two frames of content in which the same dither pattern was applied or substantially the same dither patterns were applied. Relatively light regions 162C, 162D may be indicative of areas where the dither patterns of the two frames differ. For instance, the light regions 162C, 162D may correspond to areas in the frames of content in which different sized foveation grouping regions are located (e.g., boundaries between foveation grouping regions having different resolutions or boundaries between foveation grouping regions and dither blocks) or indicate shifts in foveation groupings between frames of content. More specifically, the light regions 162C, 162D may occur at or near borders between foveation grouping regions that include different numbers of pixels (e.g., a border between one foveation grouping region associated with relatively high resolution content and another foveation grouping region associated with relatively lower resolution content).

Figure 12:
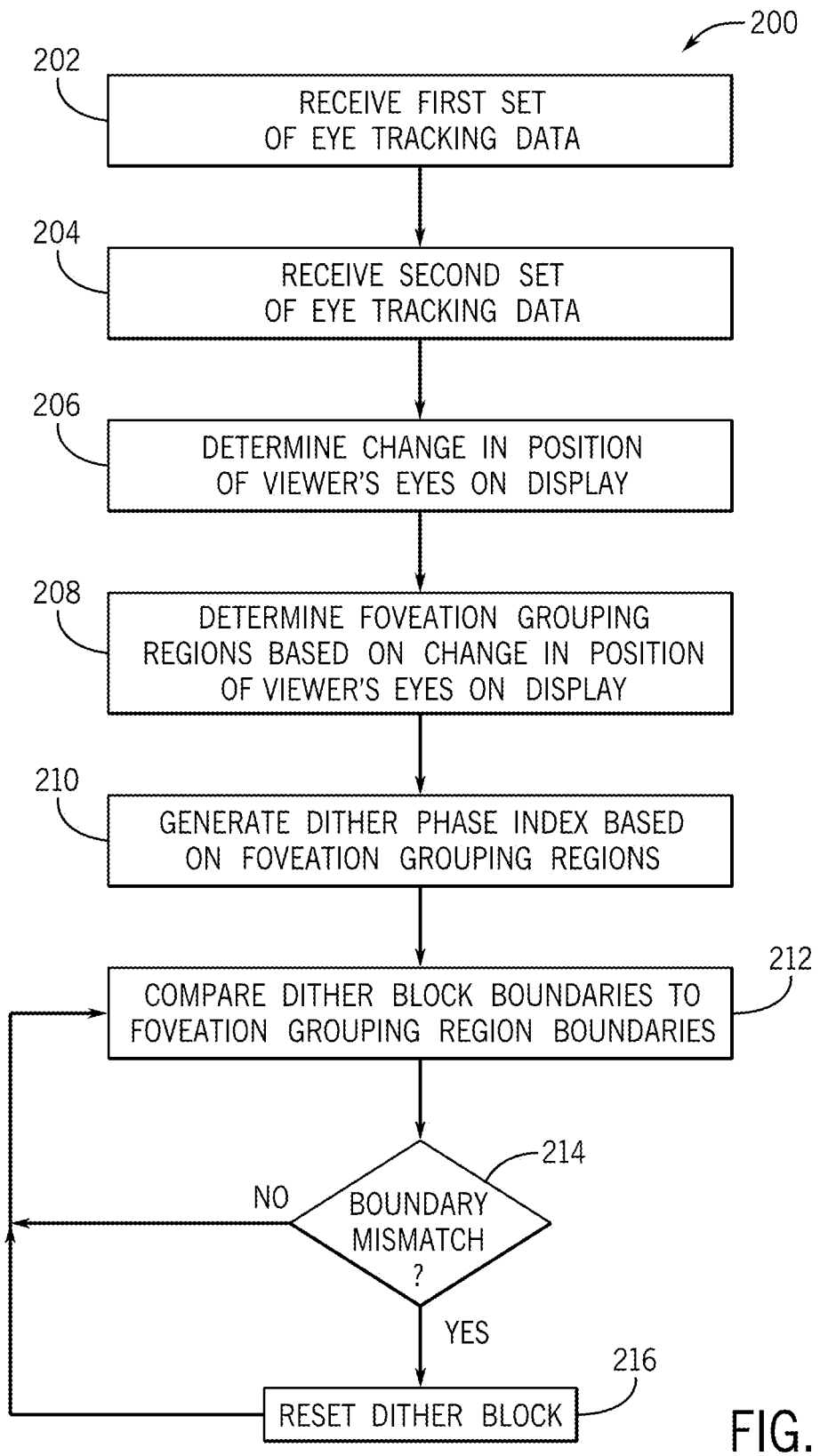
FIG. 12 is a flow diagram of a process for generating gaze-independent dither patterns, in accordance with an embodiment.

Continuing with the discussion of gaze-independent dither techniques, FIG. 12 is a flow diagram of a process 200 for generating dither patterns independently of a user's gaze. The process 200 may be performed by the processor core complex 12, image processing circuitry 30, or a combination thereof by executing instructions stored in the local memory 14 or main memory storage device 16. Furthermore, while operations of the process 200 are described below in a particular order, it should be noted that the operations of the process 200 may be performed in an order that differs from the order described below in other embodiments. The process 200 generally includes receiving a first set of eye tracking data (e.g., process block 202), receiving a second set of eye tracking data (e.g., process block 204), determining a change in position of user's eyes on the electronic display 18 (e.g., process block 206), determining foveation grouping regions based on the change in position of the user's eyes (e.g., process block 208), generating a dither phase index based on the foveation grouping regions (e.g., process block 210), comparing dither block boundaries to foveation grouping region boundaries (e.g., process block 212), determining whether there is a foveation boundary mismatch (e.g., decision block 214), and returning to compare the dither block boundaries to foveation grouping region boundaries (e.g., process block 212) when there is not a foveation boundary mismatch. When there is a foveation boundary mismatch, the process 200 may include resetting a dither block (e.g., process block 216) and returning to compare the dither block boundaries to foveation grouping region boundaries (e.g., process block 212).

At process block 202, a first set of data regarding where on the electronic display 18 a user's eyes are focused at a first time may be received. The data may be obtained and sent via eye tracking components of the electronic device 10, such as the eye tracker 32. Similarly, at block 204, a second set of data regarding where on the electronic display 18 the user's eyes are focused at a second time may be received. Based on the first and second sets of data, at block 206, a change in the position of the user's eyes between the first and second times may be determined.

Figure 13:
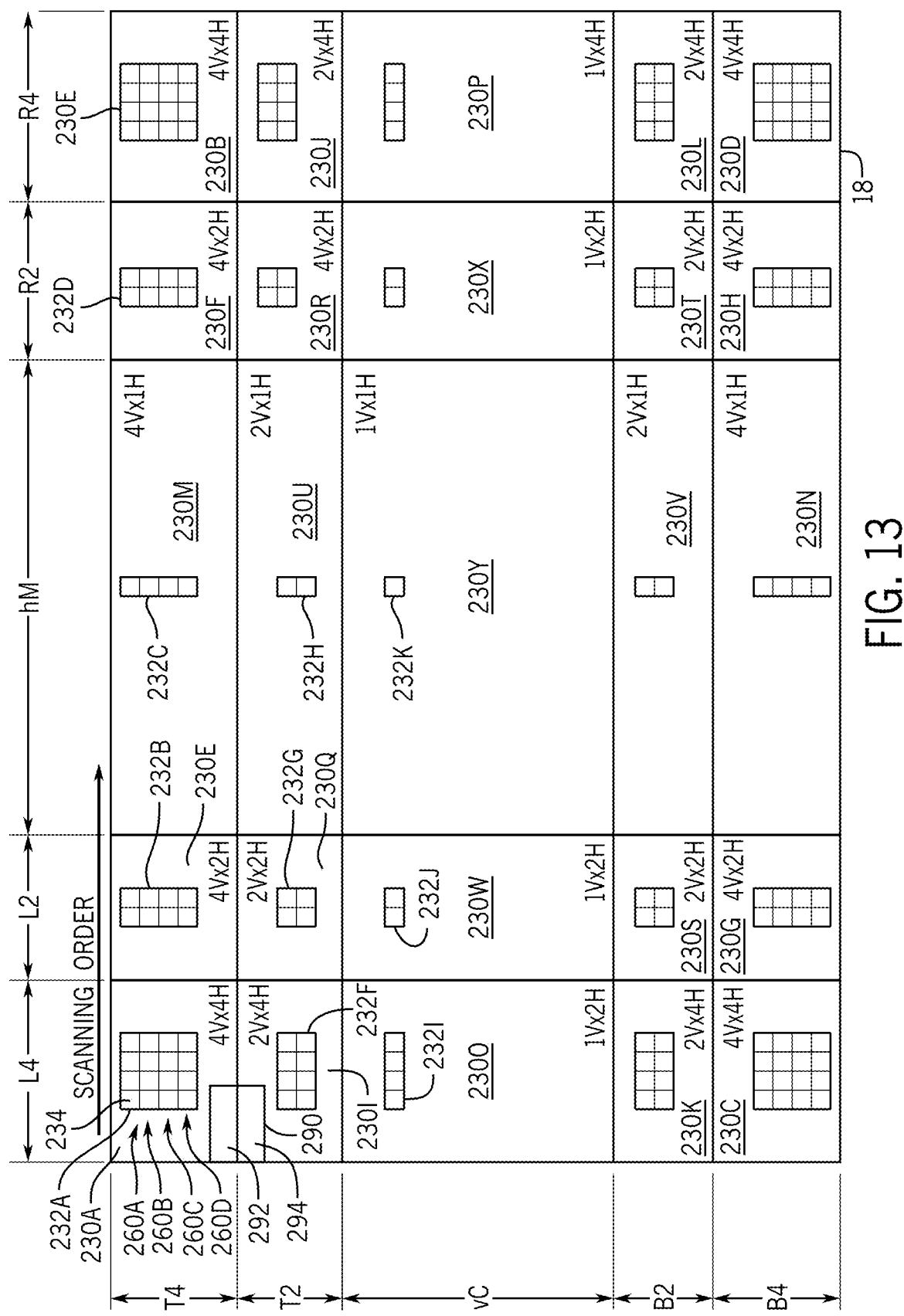
FIG. 13 illustrates foveation grouping regions, in accordance with an embodiment.

At process block 208, foveation grouping regions may be determined based on the change in position of the user's eyes. For instance, because the user's gaze may have shifted, the various portions of the electronic display 18 in which different resolution portions of content will be displayed may be determined. Foveation grouping regions may correspond to the various regions of the electronic display 18 in which content of different resolutions will be displayed. To help illustrate foveation grouping regions, FIG. 13 is provided. In particular, FIG. 13 illustrates various foveation grouping regions 230A-Y. Regions 230A-D correspond to a low (e.g., lowest) resolution portion of the electronic display 18. For example, the regions 230A-D may be relatively far from a point on the electronic display 18 on which the user's eyes are focused. Regions 230E-Y may respectively correspond to portions of the electronic display 18 in which gradually higher resolution content will be displayed (e.g., based on the detected gaze of the user). For example, the region 230Y may be a highest resolution region, and the user's gaze may have been detected to be at or near a center point of the region 230Y (which may correspond to a center point of the display 18). Accordingly, the foveation grouping regions 230A-Y may be areas in which various sized foveation groups (e.g., blocks 232) are utilized. As illustrated, the foveation groups may range from 1×1 blocks (e.g., in region 230Y) to 4×4 blocks (in regions 230A-D), with the foveation groups in the regions 230A-Y generally increasing in size (and therefore decreasing in resolution) the farther from a point on the display 18 from where the user's gaze may have been detected.

When gaze-independent dithering is used, dither blocks, or groups of pixels may have the same or similar dither characteristics (e.g., a random number indicative of dither for the pixels) that is independent of the foveation group regions (e.g., regions 230A-F). Indeed, the dither blocks may be related to the native pixel locations on the electronic display 18. However, because the content being displayed on the electronic display 18 is determined based on the foveation groups, there may be portions of the electronic display 18 in which dither blocks include pixels from different foveation grouping regions. When pixels in one dither block include pixels from different foveation grouping regions, it may be said that there is a "foveation boundary mismatch." Foveation boundary mismatches may cause a dither pattern to change between frames of content. For example, in some cases, when images of successive frames are overlaid, the resulting image may appear to be more similar to the image 120 (associated with gaze-dependent dither techniques) than the image 160 (associated with gaze-independent dither techniques). Accordingly, to increase the uniformity of dither patterns between frames, techniques discussed below may be utilized to correct for foveation boundary mismatches.

Returning to FIG. 12 and the discussion of the process 200, at process block 210, a dither phase index may be determined based on the foveation grouping regions (e.g., regions 230A-Y). The dither phase index may enable foveation boundary mismatches to be detected. As discussed below with respect to FIG. 13 and FIG. 14, to determine or generate the dither phase index, the processor core complex 12 (or image processing circuitry 30) may use a multi-step linear-feedback shift register in which the sizes of the steps are determined based on the foveation grouping region 230 in each portion of the electronic display 18. For instance, FIG. 13 illustrates several blocks 232 (collectively referring to blocks 232A-K) that are scanned and used to populate the linear-feedback shift register. In a foveation domain, a first block 232A is a four by four (4×4) block, a second block 232B is a four by two (4×2) block, and a third block 232C is a four by one (4×1) block. That is, the sizes of the blocks 232A-J correspond to particular foveation grouping regions, and, as illustrated, the blocks 232 (collectively referring to blocks 232A-K) range in size from one by one (1×1) to four by four (4×4). It should be noted that each foveation grouping region 230 includes several of the same type of the blocks 232. For instance, region 230A includes several blocks 232A, region 232E includes several blocks 232B, region 230C includes several blocks 232C, and so on. The blocks 232 may each include at least one block 234, which may be referred to as a pixel block. The pixel blocks 234 may be part of the grouped pixel locations 106C. In the native pixel domain, each pixel block 234 may correspond to sixteen pixels (e.g., a block that is four pixels wide by four pixels long) of the electronic display 18. Thus, because the block 232A is a 4×4 block that includes sixteen of the pixel blocks 234, the block 232 corresponds to 256 pixels of the electronic display 18 (e.g., an area sixteen pixels wide by sixteen pixels long).

Figure 14:
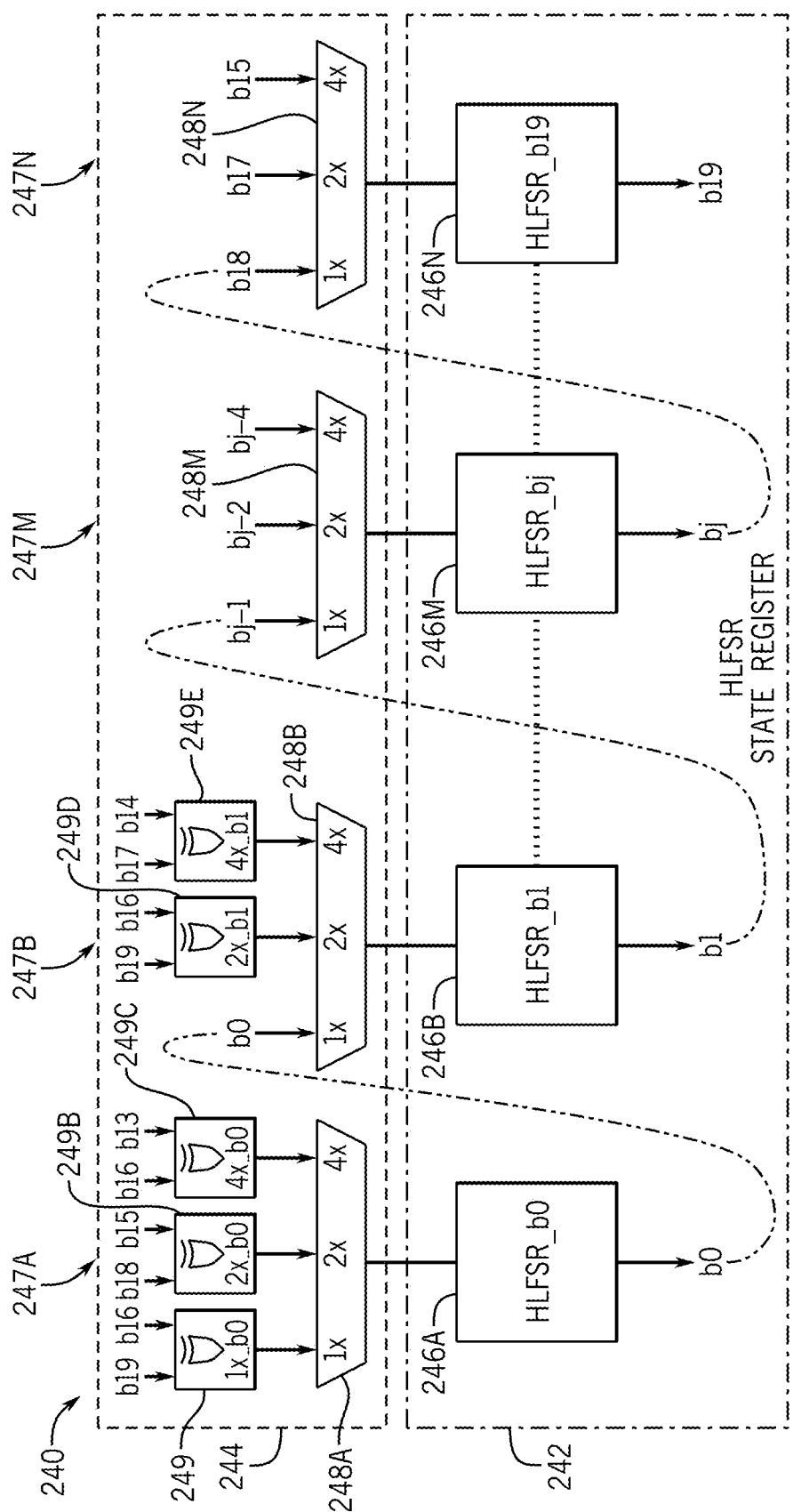
FIG. 14 illustrates a horizontal position tracking system, in accordance with an embodiment.

Bearing this in mind, FIG. 14 is a block diagram of a horizontal position tracking system 240, which may be included in the processor core complex 12, the image processing circuitry 30, the electronic display 18, or a combination thereof. The horizontal position tracking system 240 may include a (horizontal) linear-feedback shift register 242 as well as input selection circuitry 244 that selects, from several possible inputted values, which inputs to store in the linear-feedback shift register 242. The horizontal position tracking system 240 may be utilized when scanning blocks 232 to track the position (e.g., in the native pixel domain) as the scanning progresses across blocks 232 that, as discussed above, vary in size. Indeed, as the blocks 232 may be one pixel block 234 wide, two pixels blocks 234 wide, or four pixel blocks 234 wide, the horizontal position tracking system 240 may account for the varying widths of the blocks 232 to minimize temporal artifacts of dither patterns, including artifacts that could occur due to a change in a user's gaze. Indeed, as noted above, a change in the user's gaze may cause the locations of the foveation groupings 230 to change, which could alter the sizes of the blocks at various portions of the electronic display 18.

The linear-feedback shift register 242 may be twenty bits wide and advance as defined, for example, by a polynomial with an order of twenty (e.g., a polynomial with a variable being raised to the twentieth power). In other embodiments, larger order or smaller order polynomials may be utilized. In any case, the linear-feedback shift register 242 may include bits 246 (referring collectively to bits 246A-N). The values of the bits 246 may correspond to values selected by corresponding portions 247 (referring collectively to portions 247A-N) for the input selection circuitry 244. For example, each respective portion 247 of the input selection circuitry 244 may include a multiplexer 248 (e.g., multiplexers 248A-N). The multiplexers 248 may be 3:1 multiplexers 248 that receive three input values (which may be bits 246 from the linear-feedback shift register 242 as denoted in FIG. 14) and a selection input, which may correspond to the width (e.g., one-bit, two-bit, or four-bit) of the block 232 being scanned. Some portions 247 of the input selection circuitry 244 may include exclusive OR (XOR) gates. For example, a first portion 247A corresponding to bit 246A may include three XOR gates 249 (referring collectively to XOR gates 249A-C), and a second portion 247B corresponding to bit 246B may include two XOR gates: XOR gate 249D and XOR gate 249E. The XOR gates 249 (referring collectively to XOR gates 249A-E) may each receive two bit values from the linear-feedback shift register 242 (as denoted in FIG. 14) and output a bit value to provide to a multiplexer (e.g., multiplexer 248A or multiplexer 248B) based on the received bit values (e.g., outputting a "0" when the received values are equivalent and a "1" when the received values are different). Thus, each value provided to a multiplexer 248 may correspond to a four-bit step, a two-bit step, or a one-bit step, and the multiplexers 248 may select which inputted value to store (e.g., as a corresponding bit 246) in the linear-feedback shift register based on the block 232 (or, more specifically, the width of the block 232) being scanned. It should be noted that some portions 247 of the input selection circuitry 244 may include a single XOR gate 249 or no XOR gates (e.g., as illustrated with respect to portions 247M, 247N).

Referring back to FIG. 14, the block 232A may correspond to one four-step entry in a linear-feedback shift register 242 (and the horizontal position tracking system 240). The block 232B (e.g., a 4×2 block) may include eight pixel blocks 234, or 128 pixels of the electronic display 18. Additionally, the block 232B may be scanned using steps that are two pixel blocks 234 wide, corresponding to a two-step in the linear-feedback shift register 242. The block 232C, which is a 4×1 block, includes four pixel blocks 234 corresponding to 64 pixels of the electronic display 18. The block 232C may be scanned using steps that are one pixel block 234 wide, which corresponds to one-step in the linear-feedback shift register 242.

Figure 15:
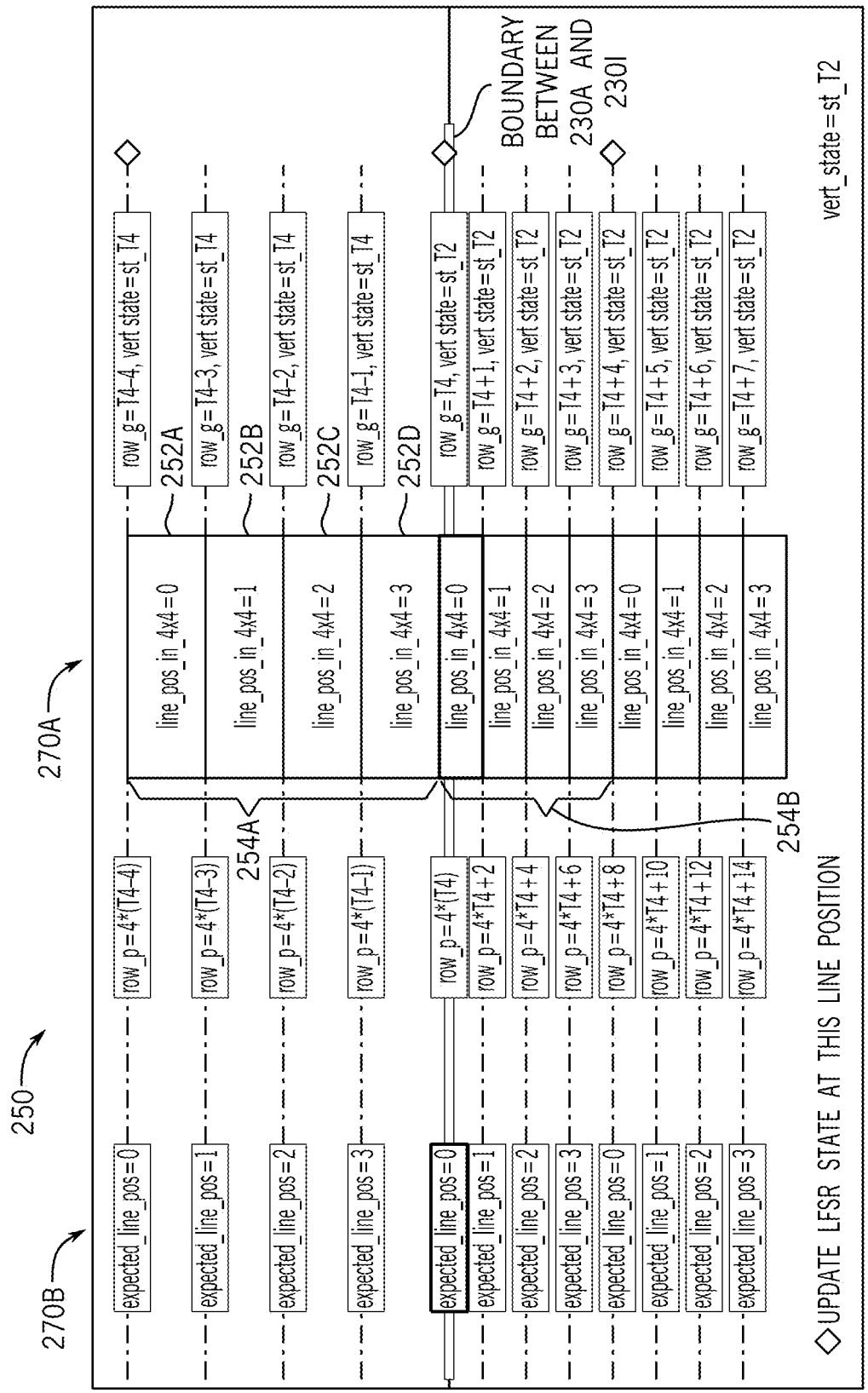
FIG. 15 is a diagram illustrating a comparison of dither block boundaries to foveation grouping region boundaries in which no foveation boundary mismatches occur, in accordance with an embodiment.

Returning to FIG. 12 and the discussion of the process 200, at process block 212, dither block boundaries may be compared to foveation grouping region 230 boundaries. FIG. 15 includes a diagram 250 illustrating such a comparison. In particular, the actual position of a sub-block 252 of grouped pixels included in dither block 254A (which may be located in foveation grouping region 230A) and dither block 254B (which may be located in foveation grouping 230I) may be compared to an expected position of the grouped pixels within the dither blocks 254A, 254B. In other words, the size (e.g., a number of pixel blocks 234) of the step associated with the linear-feedback shift register 242 for a particular row of pixel blocks 234 within dither blocks 254A, 254B can be compared to an expected row position. For instance, returning briefly back to FIG. 13, each sub-block of a dither block 254 may correspond to a row 260 of pixel blocks 234 (e.g., sub-block 252A corresponds to row 260A, sub-block 252B corresponds to row 260B, sub-block 252C corresponds to row 260A, sub-block 252D corresponds to row 260D).

Returning to FIG. 15, the diagram 250 also includes columns 270A, 270B that respectively indicate an actual position (e.g., a row number) within a dither block 254 and an expected row number within a dither block 254. For instance, in a dither block 254 that is formed by four rows of pixel blocks 234, the column 270A may indicate whether a row is, in actuality, the first, second, third, or fourth row of the dither block 254. The column 270B may indicate an expected row number that can be determined based on the size of the foveation grouping region in which a row (e.g., a row of pixel blocks 234) is located.

The expected row number $N_{exp}$ (e.g., a row of pixel blocks 234) may be determined by dividing the row number $N_{pixel}$ (in pixel domain) of the first row of pixels in a pixel block 234 by the foveation grouping size of the foveation grouping region in which the pixel block 234 is located. A modulo operation (e.g., mod 4) may be applied to the result. A value of 1 may be added to the result of the modulo operation. In a dither block with n rows, the value of the expected row number may be a value between one and n (inclusive of one and n). The value of the row number may be a value between zero and x−1 (inclusive of zero and x−1), where x is the number of rows of pixels included in the electronic display 18.

An example of determining the actual and expected row number for a pixel block 234 will now be provided with regard to sub-block 252C. The pixel sub-block 252C may correspond to the row 260C of the first block 232A of FIG. 14 that is four pixel blocks 234 wide. Because the row 260C is the third row of the first block 232A, the actual row number in this case would be three, which is indicated in the column 270A ("line_pos_in_4×4=3"). For the expected row number, the value of $N_{pixel}$ would be eight because the first row of pixels within the row 260C is the ninth row of pixels (e.g., pixel rows 0-8 are included in rows 260A and 260B), and the value of G would be four. Eight divided by four gives quotient of two. The remainder of two divided by four (i.e., 2 mod 4) is two. And, two plus one is three. Therefore, the value of $N_{exp}$ for the sub-block 260C would be three, which is indicated by the column 270B.

The horizontal position tracking system 240 may also be utilized to determine whether to advance to the next row 260 when determining expected values (indicated in the column 270B). To make such a determination, an odd-parity function or an XOR function may be application across the bits 246 of the linear-feedback shift register 242 to determine a state value for the row (and then advancing to the next row when appropriate as determined).

Returning to FIG. 12 and the discussion of the process 200, at decision block 214, whether a foveation boundary mismatch is present may be determined. For example, referring to FIG. 15, values of the columns 270A, 270B may be stored in separate registers, and the values of the registers may be compared to one another to determine if a foveation boundary mismatch is present. As illustrated, in FIG. 15, each of the actual row values in column 270A matches its corresponding expected row value provided in column 270B. Accordingly, there are no foveation boundary mismatches illustrated in FIG. 15. That no foveation boundary mismatch is detected may correspond to the dither blocks 254 including rows of pixel blocks 234 that are found within a common foveation grouping region. For instance, for dither block 254A, each of the sub-blocks 252A-D is four pixel blocks 234 wide (e.g., as indicated by "4×4").

Referring back to FIG. 12, when no foveation boundary mismatch is detected at decision block 214, the processor core complex 12 or image processing circuitry 30 may return to process block 212 and continue to compare dither block boundaries to foveation grouping region boundary. However, if a foveation boundary mismatch is detected, at process block 216, a dither block may be reset.

Figure 16:
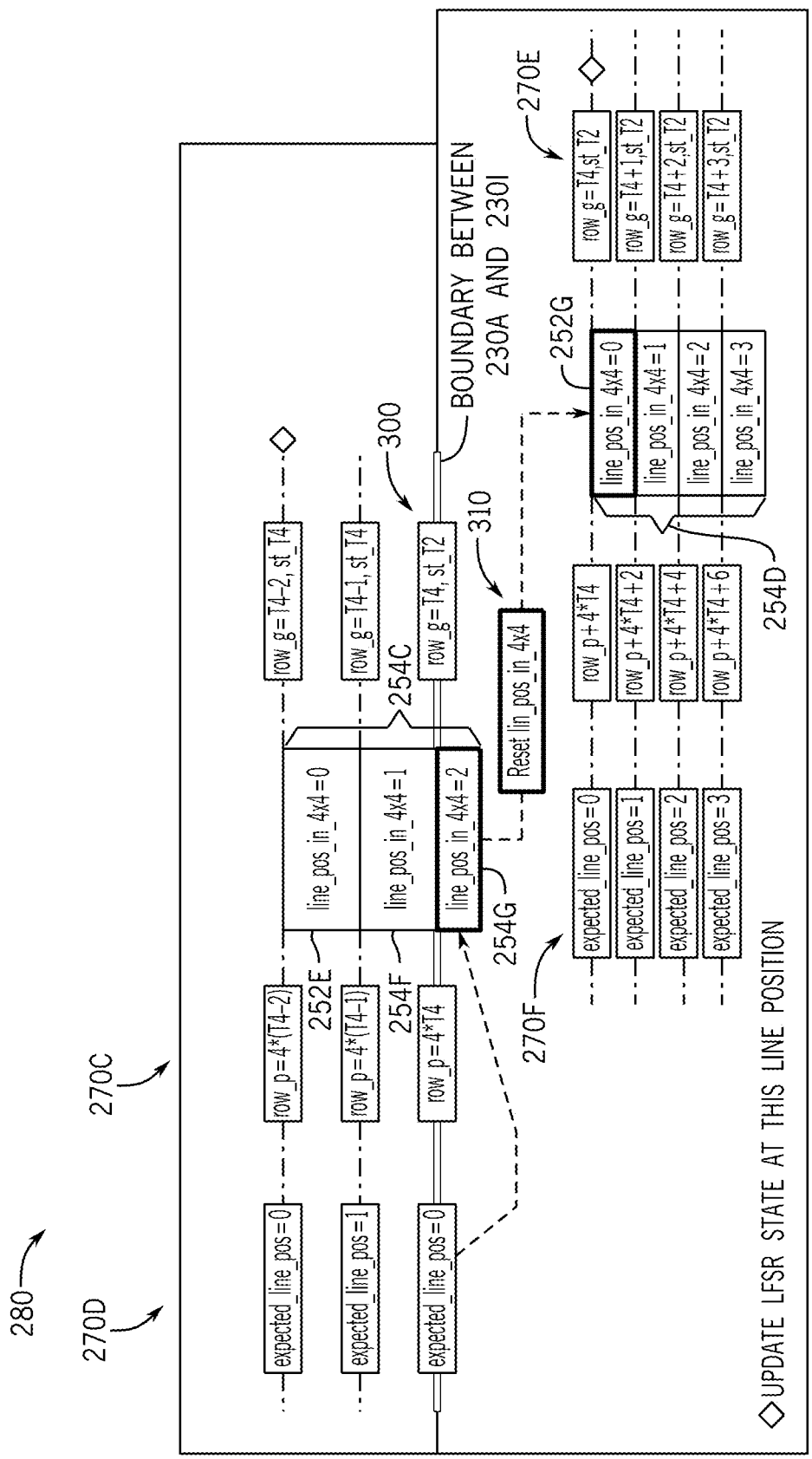
FIG. 16 is a diagram illustrating 1) a comparison of dither block boundaries to foveation grouping region boundaries in which a foveation boundary mismatch occurs and 2) correcting the foveation grouping mismatch, in accordance with an embodiment.

FIG. 16 illustrates an example of a foveation boundary mismatch. More specifically, FIG. 16 includes a diagram 280 in which a dither block 254C includes sub-blocks 252E-G indicative of rows of pixel blocks 234 that are not all located within the same foveation grouping region 230. For example, the location of the dither block 254C within the electronic display 18 may correspond to box 290 in FIG. 13. As illustrated in FIG. 13, a first portion 292 of the box 290 is located within a 4×4 foveation grouping region (e.g., foveation grouping region 230A), while a second portion 294 of the box 290 is located within a 4×2 foveation grouping region (e.g., foveation grouping region 230B). Expanding on this example, the first portion 292 may include two rows of pixel blocks 234 that are located within the foveation grouping region 230A and at least one row of pixel block 234 that is located within the foveation grouping region 230I.

Referring back to FIG. 16, the actual row values of column 270C for dither block 254C correspond to rows of pixel blocks 234 found within the box 290. The values of column 270D indicate expected values associated with the dither block 254C. As depicted by arrow 300, a foveation boundary mismatch is determined to exist. More specifically, this foveation boundary mismatch indicated by the arrow 300 corresponds to the second portion 294 of the box 290 (e.g., a fourth row of pixel blocks 234 corresponding to sub-block 252H of the dither block 254C) being located in a different foveation grouping region compared to the first portion 292 of the box 290. While the dither block 254C is four pixel blocks 234 wide, the foveation grouping region 230B that the second portion 294 of the box 290 is located in corresponds to a width of two pixel blocks 234. If left untreated, more foveation group mismatches may continue in subsequent dither blocks. As noted above, foveation group mismatches may cause different dither patterns to be used in different frames of content. For instance, the higher the amount of foveation group mismatches, the greater the number of differences between dither patterns for two frames of content may be, which may increase the amount of perceivable visual artifacts on the electronic display 18.

FIG. 16 is also illustrative of correcting the foveation boundary mismatch 300, for example, by performing a foveation boundary mismatch reset 310 utilizing hardware included in the electronic device 10, such as the linear-feedback shift register 242 or buffers that may be included in the local memory 14 (or main memory storage device 16). In this approach, the dither operation is completed by saving a first row (e.g., a row of group pixels 234 corresponding to sub-block 252E of the dither block 254C) to a first buffer, and applying a dither pattern to a second row (e.g., a next row of group pixels 234 corresponding to sub-block 252F of the dither block 254C) and the row saved in the buffer. A dither pattern may continue to be applied in this manner until a foveation grouping mismatch is detected, in which case the next row of pixel blocks 234 (e.g., corresponding to sub-block 252G of dither blocks 254C, 254D) may be saved to a second, different buffer, and the linear-feedback shift register 242 (or a separate buffer) may be reset to account for a new dither block (e.g., dither block 254D) having a first row (e.g., row 252G within pixel block 254D) has an actual and expected value of zero. In other words, another dither may be applied to the next row (e.g., row 252G, which could correspond to a first row of pixel blocks 234 in the foveation grouping region 230I). For instance, at sub-block 252G of FIG. 16, the foveation grouping mismatch 300 may be detected due to the actual and expected row values being different. The index for the actual position may be reset (as indicated by foveation boundary mismatch reset 310), the row 252 (e.g., row 252G) at the beginning of the mismatch 300 may become the first row 252 of another dither block 254D, and dithering may proceed using the newly generated dither block(s). After the foveation boundary mismatch reset 310 has been performed, the actual row numbers (e.g., as indicated by column 270E) and the expected row numbers (e.g., as indicated by column 270F) match, signifying the elimination of the detected foveation boundary mismatch.

It should also be noted that the foveation boundary mismatch reset 310 may be performed using software, such as an algorithm or instructions that may be stored on the local memory 14 or main memory storage device 16 and executed by the processor core complex 12 or image processing circuitry 30. To perform foveation boundary mismatch reset 310, the processor core complex 12 or image processing circuitry 30 may cause the value of an actual row number of an index to be modified to match an expected row number (e.g., zero), and the new dither block 254D may be used. As shown in FIG. 16, after the reset occurs, the actual row numbers (e.g., as indicated by column 270E) and the expected row numbers (e.g., as indicated by column 270F) match, signifying the elimination of the detected foveation boundary mismatch.

Returning to FIG. 12 and the discussion of the process 200, after resetting the dither block (e.g., at process block 216), the process 200 may return to process block 212 and continue comparing dither block boundaries to foveation grouping region boundaries. The process 200 may be completed, for example, when each dither block boundary and foveation grouping region in an image (e.g., a frame of content) have been compared and/or when each detected foveation grouping boundary mismatch has been corrected. For instance, as noted above, foveation region boundary mismatches may be corrected for by resetting dither blocks in accordance with the discussion of FIG. 17 and FIG. 18 above.

While the process 200 is discussed above as being performed based on a change in the position of a user's gaze, it should be noted that, in other embodiments, the process 200 may be performed based on a detected gaze of the user at a time associated with one particular frame. In other words, foveation grouping regions for a frame of dynamically foveated image content may be determined based on eye tracking data associated with the frame of content, and a dither pattern may be generated for such a frame of image content.

Accordingly, the present disclosure provides gaze-independent dither techniques that may be used to dither foveated content, such as dynamically foveated content. For example, as discussed above, dither patterns may be applied based on the native location of pixels within an electronic display rather than based on groups of pixels that are determined based on foveation grouping regions as may be done when utilizing gaze-dependent dither techniques. Moreover, the presently disclosed dither techniques may be used to correct for foveation grouping mismatches that can occur when pixels included in a group of pixels (e.g., several pixels defined based on a native location within an electronic display) are located in more than one foveation grouping region. As such, the techniques described herein increase the uniformity of dither patterns that are applied when presenting foveated content on a display.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. An electronic device, comprising:
a display;
an eye tracker configured to collect eye tracking data regarding a user gaze across the display; and
processing circuitry operatively coupled to the display and configured to:
generate pixel data for a plurality of frames of content based at least in part on the eye tracking data, wherein respective frames of the plurality of frames of content comprise a plurality of foveation grouping regions, the plurality of foveation grouping regions comprising a relatively high spatial resolution grouping region and a relatively low spatial resolution grouping region, the relatively high spatial resolution grouping region being associated with a first portion of the display and the relatively low spatial resolution grouping region being associated with a second different portion of the display;
determine a plurality of dither blocks independent of the user gaze using a horizontal linear-feedback shift register and input selection circuitry that selects, from several possible inputted values, which inputs to store in the horizontal linear-feedback shift register to account for varying widths of the plurality of dither blocks, wherein each of the plurality of dither blocks corresponds to a subset of a plurality of pixels of the display; and
apply a dither pattern to the frames of the plurality of frames of content based at least in part on the plurality of dither blocks.

2. The electronic device of claim 1, wherein:
the processing circuitry is configured to determine a plurality of pixel blocks; and
each pixel block of the plurality of pixel blocks:
corresponds to a portion of the plurality of pixels; and is defined based at least in part on a native location of the portion of the plurality of pixels within the display.

3. The electronic device of claim 2, wherein the processing circuitry is configured to:
determine whether a dither block of the plurality of dither blocks comprises a pixel block of the plurality of pixel blocks that is located within more than one foveation grouping region of the plurality of foveation grouping regions of a single frame of the plurality of frames of content based on the horizontal linear-feedback shift register; and
reset the dither block when the processing circuitry determines the dither block comprises a pixel block that is located within more than one foveation grouping region of the plurality of foveation grouping regions.

4. The electronic device of claim 3, wherein the processing circuitry is configured to determine whether the dither block comprises a pixel block that is located within more than one of the plurality of foveation grouping regions by determining whether an expected row value for a portion of the dither block matches an actual row value of the portion of the dither block.

5. The electronic device of claim 4, wherein the portion of the dither block corresponds to a row of the plurality of pixel blocks or a portion thereof.

6. The electronic device of claim 4, wherein the processing circuitry is configured to determine whether a foveation boundary mismatch is present based at least in part on the horizontal linear-feedback shift register that is populated based at least in part on the plurality of foveation grouping regions selected as the inputs in the input selection circuitry.

7. The electronic device of claim 6, wherein the processing circuitry comprises a position tracking system that comprises the linear-feedback shift register and the input selection circuitry, wherein the position tracking system is configured to account for a dimension of pixel blocks within the foveation grouping regions of the plurality of foveation grouping regions.

8. The electronic device of claim 7, wherein the dimension comprises a width of the pixel blocks.

9. The electronic device of claim 7, wherein the input selection circuitry comprises a plurality of portions, wherein each respective portion of the input selection circuitry corresponds to a respective bit of the linear-feedback shift register.

10. The electronic device of claim 9, wherein at least a first portion of the plurality of portions of the input selection circuitry comprises a multiplexer configured to receive a plurality of bits from the linear-feedback shift register and, based on the dimension of a pixel block, select a bit from the plurality of bits to store in the linear-feedback shift register.

11. The electronic device of claim 10, wherein at least a second portion of the plurality of portions comprises one or more exclusive OR (XOR) gates each configured to receive two bits from the linear-feedback shift register and output a value to a second multiplexer of the input selection circuitry.

12. An electronic device comprising:
a display;
an eye tracker configured to collect eye tracking data regarding a user gaze on the display; and
processing circuitry operatively coupled to the display and configured to:
receive the eye tracking data;
generate pixel data for respective frames of a plurality of frames of content based at least in part on the eye tracking data such that the content is configured to be shown on the display in a dynamically foveated manner;
determine a plurality of dither blocks for the respective frames of the plurality of frames of content independent of the user gaze;
apply a dither pattern to the respective frames of the plurality of frames of content based at least in part on the plurality of dither blocks;
determine whether a foveation boundary mismatch is present in a frame of the plurality of frames of content using a position tracking system comprising a linear-feedback shift register and input selection circuitry that selects, from several possible inputted values, which inputs to store in the horizontal linear-feedback shift register to account for varying widths of the plurality of dither blocks, wherein the foveation boundary mismatch corresponds to a dither block of the plurality of dither blocks including pixels that are located in more than one foveation grouping region of a plurality of foveation grouping regions, wherein different foveation grouping regions of the plurality of foveation grouping regions are associated with a different spatial resolution of the content and a different portion of the display.

13. The electronic device of claim 12, wherein the processing circuitry is configured to determine whether the foveation boundary mismatch is present based at least in part on the linear-feedback shift register that is populated based at least in part on the plurality of foveation grouping regions selected as the inputs in the input selection circuitry.

14. The electronic device of claim 13, wherein the processing circuitry is configured to:
determine, at least partially based on one or more bits of the linear-feedback shift register, an actual row value of a sub-block of the dither block, wherein the actual row value of the dither block corresponds to a row of pixel blocks of a subset of a plurality of pixel blocks within the dither block; and
determine an expected row value of the sub-block.

15. The electronic device of claim 14, wherein the processing circuitry is configured to:
determine the foveation boundary mismatch is present when the actual row value and expected row value are different; and
cause a new dither block to be used in response to determining the foveation boundary mismatch is present.

16. The electronic device of claim 12, wherein the electronic device comprises a computer, a mobile phone, a portable media device, a tablet, a television, or a virtual-reality headset.

17. A non-transitory computer-readable medium comprising instructions that, when executed, are configured to cause processing circuitry to:
receive eye tracking data regarding a user gaze at a display;
generate pixel data for each frame of a plurality of frames of content based at least in part on the eye tracking data such that the content is configured to be shown on the display in a dynamically foveated manner;
apply a dither pattern to the frames of the plurality of frames of content based at least in part on a plurality of dither blocks and a plurality of pixel blocks, wherein each dither block of the plurality of dither blocks comprises a portion of the plurality of pixel blocks, wherein each pixel block of the plurality of dither blocks comprises a subset of a plurality of pixels of the display, wherein the plurality of dither blocks is determined independently of the user gaze;

determine, based at least partially using a position tracking system comprising a linear-feedback shift register and input selection circuitry that selects, from several possible inputted values, which inputs to store in the horizontal linear-feedback shift register to account for varying widths of the plurality of dither blocks, whether a foveation boundary mismatch is present in a frame of the plurality of frames of content, wherein the foveation boundary mismatch corresponds to a dither block of the plurality of dither blocks including pixels that are located in more than one foveation grouping region of a plurality of foveation grouping regions, wherein different foveation grouping regions are associated with different pixel block sizes of the content and different portions of the display; and cause a dither block reset in response to determining a foveation boundary mismatch associated with the dither block.

18. The non-transitory computer-readable medium of claim 17, wherein the instructions, when executed, are configured to cause the processing circuitry to determine whether a foveation boundary mismatch is present in the dither block by:

determining an actual row value of a sub-block of the dither block, wherein the actual row value of the dither block corresponds to a row of pixel blocks of a subset of the plurality of pixel blocks within the dither block;

determining an expected row value of the sub-block; and determining the foveation boundary mismatch is present when the actual row value and expected row value are different.

19. The non-transitory computer-readable medium of claim 18, wherein the instructions, when executed, are configured to cause the processing circuitry to cause the dither block reset by causing a new dither block to be used.

20. The non-transitory computer-readable medium of claim 19, wherein the sub-block of the dither block comprises a first sub-block of the new dither block.

* * * * *